(12) United States Patent
Gao et al.

(10) Patent No.: US 7,276,314 B2
(45) Date of Patent: Oct. 2, 2007

(54) LITHIUM METAL DISPERSION IN SECONDARY BATTERY ANODES

(75) Inventors: Yuan Gao, Monroe, NJ (US); John L. Burba, III, Charlotte, NC (US)

(73) Assignee: FMC Corporation, Philadelphia, PA (US)

( * ) Notice: Subject to any disclaimer, the term of this patent is extended or adjusted under 35 U.S.C. 154(b) by 636 days.

(21) Appl. No.: 10/760,007

(22) Filed: Jan. 16, 2004

(65) Prior Publication Data

US 2004/0146784 A1 Jul. 29, 2004

Related U.S. Application Data

(63) Continuation of application No. 10/025,946, filed on Dec. 19, 2001, now Pat. No. 6,706,447.

(60) Provisional application No. 60/257,994, filed on Dec. 22, 2000.

(51) Int. Cl.
*H01M 4/58* (2006.01)
(52) U.S. Cl. .............................. 429/231.95; 429/231.4; 252/182.1
(58) Field of Classification Search ................ 429/224, 429/231.4, 231.8, 232, 231.95; 252/182.1
See application file for complete search history.

(56) References Cited

U.S. PATENT DOCUMENTS

| | | | |
|---|---|---|---|
| 3,508,967 A * | 4/1970 | Lyall et al. | 429/231.8 X |
| 4,615,959 A | 10/1986 | Hayashi et al. | |
| 4,668,595 A | 5/1987 | Yoshino et al. | |
| 5,153,082 A | 10/1992 | Ogino et al. | |
| 5,286,582 A | 2/1994 | Tahara et al. | |
| 5,312,611 A | 5/1994 | Takami et al. | 423/447.6 |
| 5,312,623 A * | 5/1994 | Plichta et al. | 429/224 |
| 5,587,256 A | 12/1996 | Wilson et al. | |
| 5,672,446 A | 9/1997 | Barker et al. | |
| 5,707,756 A | 1/1998 | Inoue et al. | |

(Continued)

FOREIGN PATENT DOCUMENTS

DE 689 10 843 8/1989

(Continued)

OTHER PUBLICATIONS

European Search Report corresponding to Great Britain application No. GB 0209424.1; Date of Mailing: Jul. 11, 2002.

(Continued)

*Primary Examiner*—Stephen J. Kalafut
(74) *Attorney, Agent, or Firm*—Myers Bigel Sibley & Sajovec, PA

(57) ABSTRACT

The present invention is a secondary battery having a high specific capacity and good cycleability, and that can be used safely. The secondary battery is manufactured to include an anode formed from a host material capable of absorbing and desorbing lithium in an electrochemical system such as a carbonaceous material, and lithium metal dispersed in the host material. The freshly prepared anodes of the invention are combined with a positive electrode including an active material, a separator that a separates the positive electrode and the negative electrode, and an electrolyte in communication with the positive electrode and the negative electrode. The present invention also includes a method of preparing a freshly prepared anode and a method of operating a secondary battery including the anode of the invention.

11 Claims, 1 Drawing Sheet

U.S. PATENT DOCUMENTS

| | | | |
|---|---|---|---|
| 5,725,968 A | 3/1998 | Sato et al. | |
| 5,753,387 A | 5/1998 | Takami et al. | |
| 5,753,388 A | 5/1998 | Koksbang et al. | |
| 5,807,645 A * | 9/1998 | Takeuchi et al. | 429/232 X |
| 5,948,569 A | 9/1999 | Moses et al. | 429/246 |
| 5,951,919 A * | 9/1999 | Hwang et al. | 429/224 X |
| 5,958,622 A | 9/1999 | Kojima et al. | 429/218.1 |
| 6,156,457 A | 12/2000 | Takami et al. | 429/231.4 |
| 6,168,885 B1 | 1/2001 | Narang et al. | |
| 6,183,911 B1 | 2/2001 | Kweon et al. | |
| 6,265,110 B1 * | 7/2001 | Rao et al. | 429/231.8 |
| 6,270,926 B1 | 8/2001 | Yamashita et al. | 429/231.1 |
| 6,387,564 B1 | 5/2002 | Yamashita et al. | |
| 6,465,126 B1 | 10/2002 | Jannasch et al. | |
| 6,541,156 B1 * | 4/2003 | Fuse et al. | |
| 6,706,447 B2 | 3/2004 | Gao et al. | |
| 6,949,314 B1 * | 9/2005 | Hossain | 429/231.4 |
| 7,033,702 B2 * | 4/2006 | Dasgupta et al. | 429/231.4 X |
| 2002/0119373 A1 | 8/2002 | Gao et al. | |
| 2004/0002005 A1 | 1/2004 | Gao et al. | |
| 2005/0130043 A1 | 6/2005 | Gao et al. | |

FOREIGN PATENT DOCUMENTS

| | | |
|---|---|---|
| EP | 0 328 131 B1 | 8/1989 |
| EP | 0763865 A1 | 1/1992 |
| EP | 0573266 A1 | 6/1993 |
| EP | 0601832 A1 | 12/1993 |
| EP | 0696075 A2 | 8/1995 |
| EP | 0696075 A3 | 8/1995 |
| JP | 63-13282 | 1/1988 |
| JP | 4-39859 | 2/1992 |
| JP | 4-126374 | 4/1992 |
| JP | 5-234621 | 9/1993 |
| JP | 10-117406 * | 5/1998 |
| JP | 10-223259 | 8/1998 |
| JP | 10-270086 | 10/1998 |
| JP | 11-025975 | 1/1999 |
| JP | 2000-67853 | 3/2000 |
| JP | 2000-164210 | 6/2000 |
| JP | 2000164210 A | 6/2000 |
| WO | WO00/13249 | 3/2000 |

OTHER PUBLICATIONS

U.S. Appl. No. 10/900,715, filed Jul. 28, 2004, Gao et al.
U.S. Appl. No. 10/324,611, filed Dec. 20, 2002, Gao et al.
Notification of Transmittal of the International Search Report and the Written Opinion of the International Searching Authority, or the Declaration, PCT/US2004/24502, Dec. 7, 2004.
Notice to Submit Response to the Examination Report corresponding to Korean Patent Application No. 10-2002-0023709 mailed Sep. 28, 2006.
"Microencapsulation of Lithium", *U.S. Dept. of Commerce National Technical Information Service* (Dec. 31, 1985) 68 pages.

* cited by examiner

LITHIUM METAL DISPERSION IN SECONDARY BATTERY ANODES

CROSS-REFERENCE TO RELATED APPLICATIONS

This application claims the benefit of, and incorporates herein in their entireties by reference, the following United States Patent Applications and Patents: U.S. Provisional Application No. 60/257,994, filed Dec. 22, 2000 and U.S. application Ser. No. 10/025,946, filed Dec. 19, 2001, now U.S. Pat. No. 6,706,477.

FIELD OF THE INVENTION

The present invention relates to secondary batteries having high specific capacities and particularly to anodes for secondary batteries comprising a host material such as a carbonaceous material capable of absorbing and desorbing lithium in an electrochemical system and lithium metal dispersed in the host material.

BACKGROUND OF THE INVENTION

Lithium and lithium-ion secondary or rechargeable batteries have recently found use in certain applications such as in cellular phones, camcorders, and laptop computers, and even more recently, in larger power applications such as in electric vehicles and hybrid electric vehicles. It is preferred in these applications that the secondary batteries have the highest specific capacity possible but still provide safe operating conditions and good cycleability so that the high specific capacity is maintained in subsequent recharging and discharging cycles.

Although there are various constructions for secondary batteries, each construction includes a positive electrode (or cathode), a negative electrode (or anode), a separator that separates the cathode and anode, and an electrolyte in electrochemical communication with the cathode and anode. For secondary lithium batteries, lithium ions are transferred from the anode to the cathode through the electrolyte when the secondary battery is being discharged, i.e., used for its specific application. During this process, electrons are collected from the anode and pass to the cathode through an external circuit. When the secondary battery is being charged or recharged, the lithium ions are transferred from the cathode to the anode through the electrolyte.

Historically, secondary lithium batteries were produced using non-lithiated compounds having high specific capacities such as $TiS_2$, $MoS_2$, $MnO_2$ and $V_2O_5$, as the cathode active materials. These cathode active materials were coupled with a lithium metal anode. When the secondary battery was discharged, lithium ions were transferred from the lithium metal anode to the cathode through the electrolyte. Unfortunately, upon cycling, the lithium metal developed dendrites that ultimately caused unsafe conditions in the battery. As a result, the production of these types of secondary batteries was stopped in the early 1990's in favor of lithium-ion batteries.

Lithium-ion batteries typically use lithium metal oxides such as $LiCoO_2$ and $LiNiO_2$ as cathode active materials coupled with a carbon-based anode. In these batteries, the lithium dendrite formation on the anode is avoided thereby making the battery safer. However, the lithium, the amount of which determines the battery capacity, is totally supplied from the cathode. This limits the choice of cathode active materials because the active materials must contain removable lithium. Furthermore, the delithiated products corresponding to $LiCoO_2$ and $LiNiO_2$ that are formed during charging (e.g. $Li_xCoO_2$ and $Li_xNiO_2$ where $0.4<x<1.0$) and overcharging (i.e. $Li_xCoO_2$ and $Li_xNiO_2$ where $x<0.4$) are not stable. In particular, these delithiated products tend to react with the electrolyte and generate heat, which raises safety concerns.

SUMMARY OF THE INVENTION

The present invention is a secondary battery having a high specific capacity and good cycleability and that operates safely. In accordance with the invention, the freshly prepared, secondary battery includes an anode that is formed of a host material capable of absorbing and desorbing lithium in an electrochemical system and lithium metal dispersed in the host material. Preferably, the lithium metal is a finely divided lithium powder and more preferably has a mean particle size of less than about 20 microns. The host material comprises one or more materials selected from the group consisting of carbonaceous materials, Si, Sn, tin oxides, composite tin alloys, transition metal oxides, lithium metal nitrides and lithium metal oxides. Preferably, the host material comprises a carbonaceous material and more preferably comprises graphite.

The freshly prepared, secondary batteries of the invention include a positive electrode including an active material, a negative electrode comprising a host material capable of absorbing and desorbing lithium in an electrochemical system and lithium metal dispersed in the host material, a separator separating the positive electrode and the negative electrode and an electrolyte in communication with the positive electrode and the negative electrode. Preferably, the cathode active material is a compound that can be lithiated at an electrochemical potential of 2.0 to 5.0 V versus lithium. For example, the cathode active material can be $MnO_2$, $V_2O_5$ or $MoS_2$, or a mixture thereof. The lithium metal in the anode is preferably a finely divided lithium powder and more preferably has a mean particle size of less than about 20 microns. The host material comprises one or more materials selected from the group consisting of carbonaceous materials, Si, Sn, tin oxides, composite tin alloys, transition metal oxides, lithium metal nitrides and lithium metal oxides. Preferably, the host material in the negative electrode comprises a carbonaceous material and, more preferably, comprises graphite. The amount of lithium metal present in the negative electrode is preferably no more than the maximum amount sufficient to intercalate in, alloy with, or be absorbed by the host material in the negative electrode. For example, if the host material is carbon, the amount of lithium is preferably no more than the amount needed to make $LiC_6$.

The present invention also includes a method of preparing a freshly prepared anode for a secondary battery that includes the steps of providing a host material that is capable of absorbing and desorbing lithium in an electrochemical system, dispersing lithium metal in the host material and forming the host material and the lithium metal dispersed therein into an anode. The lithium metal and the host material is preferably mixed together with a non-aqueous liquid to produce a slurry and then applied to a current collector and dried to form the anode. Alternatively, the anode can be formed by chemical means by immersing the host material in a suspension of lithium metal in a non-aqueous liquid, and then formed into an anode.

The present invention further includes a method of operating a secondary battery. First, a freshly prepared, secondary battery is provided that includes a positive electrode including an active material, a negative electrode comprising a host material capable of absorbing and desorbing lithium in an electrochemical system and lithium metal dispersed in the host material, a separator for separating the positive electrode and the negative electrode, and an electrolyte in communication with the positive electrode and the negative electrode. In particular, the secondary battery is manufactured with lithium metal dispersed in the host material of the anode. The freshly assembled battery is in a charged state and more preferably is in a fully charged state (with all the removable lithium present in the anode of the freshly prepared battery). The freshly prepared secondary battery is initially discharged by transmitting lithium ions from the negative electrode to the positive electrode through the electrolyte. The secondary battery can then be charged or recharged by transmitting lithium ions from the positive electrode to the negative electrode through the electrolyte and then discharged again by transmitting lithium ions from the negative electrode to the positive electrode through the electrolyte. The charging and discharging steps can occur for numerous cycles while maintaining the high specific capacities of the cathode active materials and maintaining safe operating conditions.

These and other features and advantages of the present invention will become more readily apparent to those skilled in the art upon consideration of the following detailed description and accompanying drawing, which describe both the preferred and alternative embodiments of the present invention.

DETAILED DESCRIPTION OF EMBODIMENTS OF THE INVENTION

Figure 1:
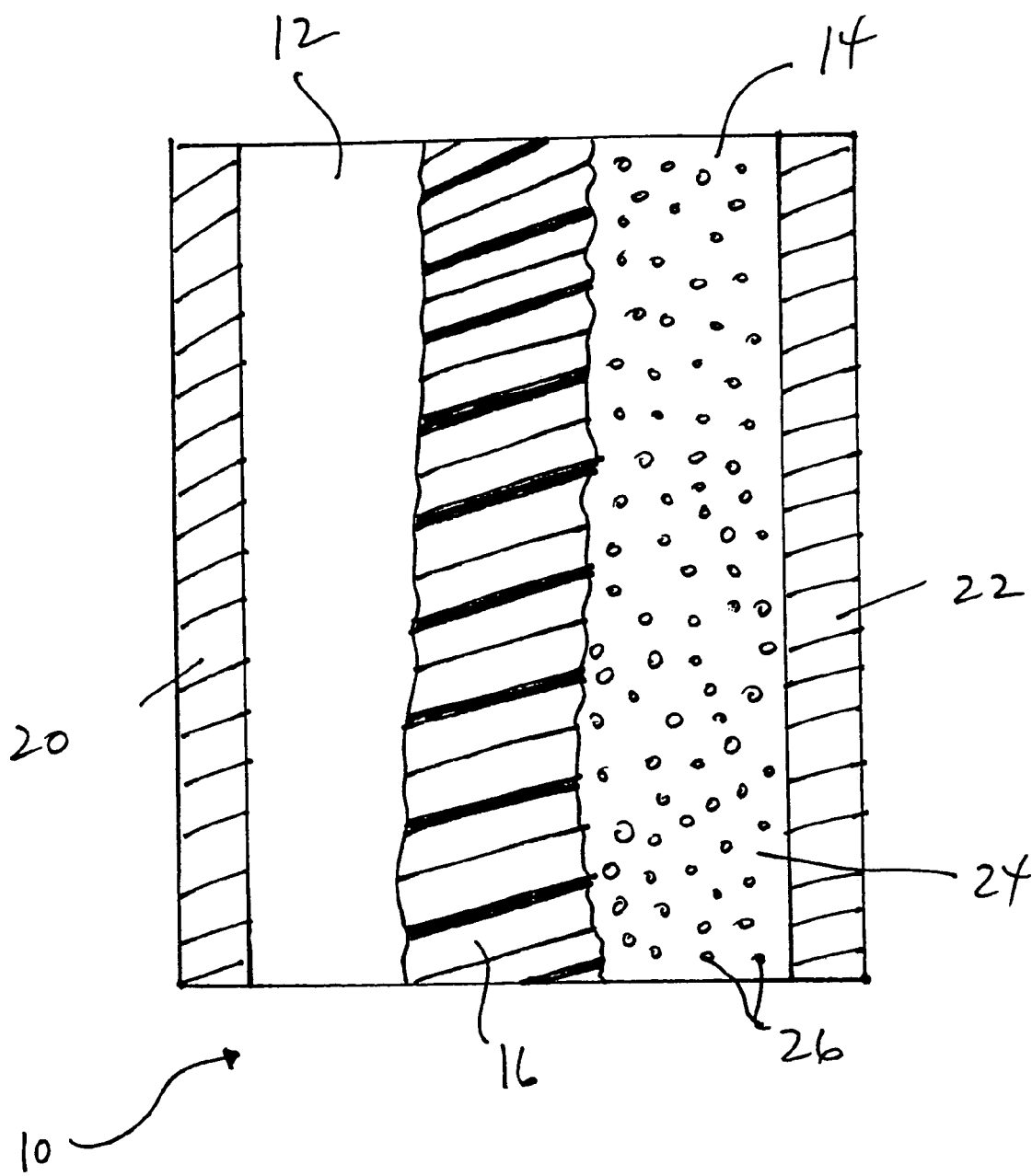
FIG. 1 illustrates a simplified secondary battery construction including a cathode, anode, separator and electrolyte, in accordance with the invention.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawing.

As illustrated in FIG. 1, the present invention is a secondary battery 10 that comprises a positive electrode or cathode 12, a negative electrode or anode 14, a separator 16 for separating the positive electrode and the negative electrode, and an electrolyte in electrochemical communication with the positive electrode and the negative electrode. The secondary battery 10 also includes a current collector 20 that is in electrical contact with the cathode and a current collector 22 that is in electrical contact with the anode. The current collectors 20 and 22 are in electrical contact with one another through an external circuit (not shown). The secondary battery 10 can have any construction known in the art such as a "jelly roll" or stacked construction.

The cathode 12 is formed of an active material, which is typically combined with a carbonaceous material and a binder polymer. The active material used in the cathode 12 is preferably a material that can be lithiated at a useful voltage (e.g. 2.0 to 5.0 V versus lithium). Preferably, non-lithiated materials such as $MnO_2$, $V_2O_5$ or $MoS_2$, or mixtures thereof, can be used as the active material, and more preferably, $MnO_2$ is used. However, lithiated materials such as $LiMn_2O_4$ that can be further lithiated can also be used. The non-lithiated active materials are preferred because they generally have higher specific capacities than the lithiated active materials in this construction and thus can provide increased power over secondary batteries that include lithiated active materials. Furthermore, because the anode 14 includes lithium as discussed below, it is not necessary that the cathode 12 include a lithiated material for the secondary battery 10 to operate. The amount of active material provided in the cathode 12 is preferably sufficient to accept the removable lithium metal present in the anode 14. For example, if $MnO_2$ is the cathode active material, then one mole of $MnO_2$ is preferably present in the cathode 12 per mole of lithium in the anode 14 to produce $LiMnO_2$ in the cathode upon discharge.

When cathode active materials are used that can be lithiated such as those described above, the removable lithium that is cycled in the battery is fully provided by the anode 14 and the battery is assembled or prepared in a fully charged state, as is preferred. Nevertheless, the cathode 12 can also include a minor amount of one or more lithiated active materials (e.g. $LiCoO_2$ or $LiNiO_2$) that do not further absorb lithium at a voltage between 2.0V and 5.0V and the battery can still be provided in a primarily charged state. In this event, the cathode preferably has less than 50% (molar) and more preferably less than 10% (molar) of the lithiated material (e.g. $LiCoO_2$ or $LiNiO_2$) as the active material. Because $LiCoO_2$ and $LiNiO_2$ do not further absorb lithium, the presence of these materials in the cathode 12 does not reduce the amount of cathode active material needed to accept the removable lithium from the anode 14.

The anode 14 is formed of a host material 24 capable of absorbing and desorbing lithium in an electrochemical system with lithium metal 26 dispersed in the host material. For example, the lithium present in the anode 14 can intercalate in, alloy with or be absorbed by the host material when the battery (and particularly the anode) is recharged. The host material includes materials capable of absorbing and desorbing lithium in an electrochemical system such as carbonaceous materials; materials containing Si, Sn, tin oxides or composite tin alloys; transition metal oxides such as CoO; lithium metal nitrides such as $Li_{3-x}Co_xN$ where $0<x<0.5$, and lithium metal oxides such as $Li_4Ti_5O_{12}$. The lithium metal 26 is preferably provided in the anode 14 as a finely divided lithium powder. In addition, the lithium metal 26 preferably has a mean particle size of less than about 20 microns, more preferably less than about 10 microns. The lithium metal can be provided as a pyrophoric powder or as a stabilized low pyrophorosity powder, e.g., by treating the lithium metal powder with $CO_2$.

The anode 14 is typically capable of reversibly lithiating and delithiating at an electrochemical potential relative to lithium metal of from greater than 0.0 V to less than or equal to 1.5. If the electrochemical potential is 0.0 or less versus lithium, then the lithium metal will not reenter the anode 14 during charging. Alternatively, if the electrochemical potential is greater than 1.5 V versus lithium then the battery voltage will be undesirably low. Preferably, the amount of lithium metal 26 present in the anode 14 is no more than the maximum amount sufficient to intercalate in, alloy with, or be absorbed by the host material in the anode 14 when the battery is recharged. For example, if the host material 24 is carbon, the amount of lithium 26 is preferably no more than the amount sufficient to make $LiC_6$. In other words, the molar ratio of lithium to carbon in the anode is preferably no more than 1:6.

In accordance with the invention, the anode 14 can be prepared by providing a host material that is capable of absorbing and desorbing lithium in an electrochemical system, dispersing lithium metal in the host material, and forming the host material and the lithium metal dispersed therein into an anode. Preferably, the lithium metal and the host material are mixed with a non-aqueous liquid such as tetrahydrofuran (THF) and a binder, and formed into a slurry. The slurry is then used to form the anode 14, for example, by coating the current collector 22 with the slurry and then drying the slurry. The lithium metal can also be provided in the anode by immersing the host material in a suspension containing lithium metal in a non-aqueous liquid such a hydrocarbon solvent (e.g. hexane). The lithium metal used in the suspension is preferably a finely divided lithium powder as discussed above. The host material can be formed into the shape of the anode and then dipped into the lithium metal suspension or it can be combined with the lithium metal suspension to form a slurry and then applied to the current collector and dried to form the anode. The non-aqueous liquid used to form the suspension can be removed by drying the anode (e.g. at an elevated temperature). No matter what method is used, the lithium metal is preferably distributed as well as possible into the host material. Accordingly, as discussed above, the lithium metal 26 preferably has a mean particle size of less than about 20 microns, more preferably less than about 10 microns.

The host material 24 in the anode 14 can include one or more materials capable of absorbing and desorbing lithium in an electrochemical system such as carbonaceous materials; materials containing Si, Sn, tin oxides or composite tin alloys; transition metal oxides such as CoO; lithium metal nitrides such as $Li_{3-x}Co_xN$ where $0<x<0.5$; and lithium metal oxides such as $Li_4Ti_5O_{12}$. Preferably, as mentioned above, the host material 24 preferably includes graphite. In addition, the host material 24 preferably includes a small amount of carbon black (e.g. less than 5% by weight) as a conducting agent.

As shown in FIG. 1, the cathode 12 is separated from the anode 14 by an electronic insulating separator 16. Typically, the separator 16 is formed of a material such as polyethylene, polypropylene, or polyvinylidene fluoride (PVDF).

The secondary battery 10 further includes an electrolyte that is in electrochemical communication with the cathode 12 and anode 14. The electrolyte can be non-aqueous liquid, gel or solid and preferably comprises a lithium salt, e.g., $LiPF_6$. The electrolyte is provided throughout the battery 10 and particularly within the cathode 12, anode 14 and separator 16. Typically, the electrolyte is a liquid, and the cathode 12, anode 14 and separator 16 are porous materials that are soaked in the electrolyte to provide electrochemical communication between these components.

As mentioned above, the battery 10 includes current collectors 20 and 22, which are used to transmit electrons to an external circuit. Preferably, the current collector 20 is made of aluminum foil and current collector 22 is made of copper foil.

The battery 10 of the invention can be prepared by methods known in the art and preferably has a layer thickness within the following ranges (from left to right in FIG. 1):

| Layer | thickness |
|---|---|
| Current collector (20) | 20-40 μm |
| Cathode (12) | 70-100 μm |
| Separator (16) | 25-35 μm |
| Anode (14) | 70-100 μm |
| Current collector (22) | 20-40 μm |

The battery 10 also includes an electrolyte dispersed throughout the cathode 12, anode 14 and separator 16, and a casing (not shown).

In operation, the freshly prepared secondary battery 10 is initially in a charged state, more preferably a fully charged state, and is initially discharged by transmitting lithium ions from the anode 14 to the cathode 12 through the electrolyte. At the same time, electrons are transmitted from the anode 14 to the cathode 12 through the current collector 22, the external circuit, and the current collector 20. The secondary battery 10 can then be charged or recharged by transmitting lithium ions from the cathode 12 to the anode 14 through the electrolyte and then discharged again as discussed above. The charging and discharging steps can occur for numerous cycles while maintaining the high specific capacities of the cathode active materials and maintaining safe operating conditions.

The secondary battery 10 can be used for various types of applications. For example, the secondary battery can be used in portable electronics such as cellular phones, camcorders, and laptop computers, and in large power applications such as for electric vehicles and hybrid electric vehicles.

The present invention provides secondary batteries having a high specific capacity, safe operating conditions and good cycleability. In particular, because lithium metal is provided in the anode, non-lithiated materials can be used as the preferred cathode active material in the secondary battery. These non-lithiated materials have higher specific capacities than the lithiated materials presently used in lithium-ion batteries. Unlike traditional lithium secondary batteries having non-lithiated cathode active materials and metallic lithium anodes, it has been discovered that secondary batteries produced using non-lithiated cathode active materials combined with the anodes of the invention operate safely and do not generate lithium dendrites upon cycling. Furthermore, the secondary batteries of the present invention are safer to operate than lithium-ion batteries, which become unstable when lithium is removed from the cathode during charging. In particular, because the cathode active material in the secondary batteries of the invention is typically in a fully charged state when the battery is freshly prepared, it is more stable then the cathode materials used in lithium-ion batteries. Moreover, the batteries of the invention can be charged and discharged numerous times while maintaining safe operating conditions and the high specific capacities of the cathode active materials.

It is understood that upon reading the above description of the present invention and reviewing the accompanying drawings, one skilled in the art could make changes and variations therefrom. These changes and variations are included in the spirit and scope of the following appended claims.

That which is claimed:

1. A method of preparing an anode for a secondary battery comprising:
providing a host material that is capable of absorbing and desorbing lithium in an electrochemical system;
dispersing an amount of lithium metal in the host material wherein the amount is no more than the maximum amount sufficient to intercalate in, alloy with, or be absorbed by the host material in the anode; and
forming the host material and the lithium metal dispersed therein into the anode.

2. The method according to claim 1, wherein said dispersing step comprises mixing the lithium metal, the host material and a non-aqueous liquid together to form a slurry.

3. The method according to claim 2, wherein said forming step comprising applying the slurry to a current collector and drying the slurry.

4. The method according to claim 1, wherein said dispersing step comprises immersing the host material in a suspension containing lithium metal and a non-aqueous liquid.

5. The method according to claim 4, wherein said dispersing step comprises immersing the host material in a suspension of lithium metal in a hydrocarbon.

6. The method according to claim 1, wherein said dispersing step comprises dispersing lithium metal having a mean particle size of less than about 20 microns in the host material.

7. The method according to claim 1, wherein said providing step includes providing a host material comprising one or more materials capable of reversibly lithiating and delithiating at an electrochemical potential versus lithium of from greater than 0.0 V to less than or equal to 1.5 V.

8. The method according to claim 1, wherein said providing step comprises providing a host material comprising one or more materials selected from the group consisting of carbonaceous materials, Si, Sn, tin oxides, composite tin alloys, transition metal oxides, lithium metal nitrides, and lithium metal oxides.

9. The method according to claim 1, wherein said providing step comprises providing a host material comprising a carbonaceous material.

10. The method according to claim 9, wherein said providing step comprises providing a host material wherein the carbonaceous material is graphite.

11. The method according to claim 10, wherein said providing step comprises providing a host material wherein the host material further comprises carbon black.

* * * * *